United States Patent
Peterson et al.

(10) Patent No.: US 10,137,830 B2
(45) Date of Patent: Nov. 27, 2018

(54) SELF-ADJUSTING LIGHTING BASED ON VIEWING LOCATION

(71) Applicant: LENOVO (Singapore) PTE, LTD., New Tech Park (SG)

(72) Inventors: Nathan J. Peterson, Durham, NC (US); Neal Robert Caliendo, Jr., Raleigh, NC (US); John Carl Mese, Cary, NC (US); Russell Speight VanBlon, Raleigh, NC (US); Arnold S. Weksler, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 38 days.

(21) Appl. No.: 14/558,075

(22) Filed: Dec. 2, 2014

(65) Prior Publication Data

US 2016/0152178 A1  Jun. 2, 2016

(51) Int. Cl.
*B60Q 3/18* (2017.01)
*B60Q 3/80* (2017.01)
*B60Q 3/47* (2017.01)
*B60Q 3/44* (2017.01)

(52) U.S. Cl.
CPC .......... *B60Q 3/18* (2017.02); *B60Q 3/80* (2017.02); *B60Q 3/44* (2017.02); *B60Q 3/47* (2017.02)

(58) Field of Classification Search
CPC .......... B60Q 3/04; B60Q 3/042; B60Q 3/044; B60Q 3/046; B60Q 3/0293
See application file for complete search history.

(56) References Cited

U.S. PATENT DOCUMENTS

| 5,604,407 | A | * | 2/1997 | Andres | B60Q 3/80 315/316 |
| 5,785,347 | A | * | 7/1998 | Adolph | B60R 21/01556 180/273 |
| 7,406,181 | B2 | * | 7/2008 | O'Boyle | G06K 9/00201 382/104 |
| 7,800,483 | B2 | * | 9/2010 | Bucher | B60Q 3/80 340/425.5 |
| 8,135,511 | B2 | * | 3/2012 | Demirdjian | B60R 21/015 701/36 |

(Continued)

FOREIGN PATENT DOCUMENTS

EP    2390139 A1 * 11/2011  ............. B60Q 3/046

*Primary Examiner* — Tung X Le
*Assistant Examiner* — Borna Alaeddini
(74) *Attorney, Agent, or Firm* — Kunzler, PC

(57) ABSTRACT

For automatically adjusting a vehicle light level based on a viewing location of an occupant, a system, apparatus, method, and computer program product are disclosed. The apparatus, in one embodiment, includes an image sensor, an occupant viewing location module that determines an illuminable region corresponding to a viewing location of a vehicle occupant based on data from the image sensor, a light level module that determines a light level for the illuminable region, and an illumination control module that adjusts an illumination setting of at least one light associated with the illuminable region based on the determined light level. In some embodiments, the apparatus includes an occupant recognition module that identifies the vehicle occupant, wherein the light level module determines the light level based on the identity of the vehicle occupant.

20 Claims, 7 Drawing Sheets

(56) References Cited

U.S. PATENT DOCUMENTS

| | | | | |
|---|---|---|---|---|
| 2002/0196201 | A1* | 12/2002 | Rosen | B60K 35/00 |
| | | | | 345/7 |
| 2003/0002165 | A1* | 1/2003 | Mathias | B60R 1/00 |
| | | | | 359/630 |
| 2003/0067432 | A1* | 4/2003 | Watanabe | B60K 35/00 |
| | | | | 345/87 |
| 2003/0169907 | A1* | 9/2003 | Edwards | G06K 9/00248 |
| | | | | 382/118 |
| 2014/0226303 | A1* | 8/2014 | Pasdar | B60Q 3/82 |
| | | | | 362/23.08 |
| 2014/0265841 | A1* | 9/2014 | Baek | B60Q 3/0226 |
| | | | | 315/77 |
| 2014/0282931 | A1* | 9/2014 | Protopapas | G06F 21/31 |
| | | | | 726/5 |
| 2014/0309806 | A1* | 10/2014 | Ricci | B60Q 1/00 |
| | | | | 701/1 |
| 2014/0309862 | A1* | 10/2014 | Ricci | G01C 21/00 |
| | | | | 701/36 |
| 2015/0239395 | A1* | 8/2015 | Rogge | H05B 37/0218 |
| | | | | 315/77 |
| 2016/0059865 | A1* | 3/2016 | Ricci | G01C 21/3484 |
| | | | | 701/36 |
| 2016/0318467 | A1* | 11/2016 | Ricci | B60R 16/037 |

* cited by examiner

SELF-ADJUSTING LIGHTING BASED ON VIEWING LOCATION

BACKGROUND

Field

The subject matter disclosed herein relates to adjusting vehicle lighting and more particularly relates to automatically adjusting a vehicle light level based on a viewing location of an occupant.

Description of the Related Art

Interior lights in vehicles may annoying or impede a driver's vision while driving at night, and may be hard to see while driving during the day. For example, while driving at night, if one of the rear roof lights are on, it makes it very difficult to see out of the rearview mirror. Also at night, the front dashboard lights are sometimes too bright and are distracting. Examples of the dashboard lights include be a navigation system, a speedometer, a radio, and the like. Further, if a user has their sunglasses on during the day, is may be difficult to see the dashboard lights.

BRIEF SUMMARY

An apparatus for automatically adjusting a vehicle light level based on a viewing location of an occupant is disclosed. A method and computer program product also perform the functions of the apparatus. The computer program product, in one embodiment, includes a computer readable storage medium that stores code executable by a processor.

The apparatus, in one embodiment, includes an image sensor, an occupant viewing location module that determines an illuminable region corresponding to a viewing location of a vehicle occupant based on data from the image sensor, a light level module that determines a light level for the illuminable region, and an illumination control module that adjusts an illumination setting of at least one light associated with the illuminable region based on the determined light level. In certain embodiments, the at least one light provides illumination at one of a plurality of illumination levels and the illumination control module sets the at least one light at an illumination level closest to the determined light level.

In some embodiments, the apparatus includes an occupant recognition module that identifies the vehicle occupant, wherein the light level module determines the light level based on the identity of the vehicle occupant. In certain embodiments, the illuminable region includes a dashboard, the at least one light associated with the illuminable region includes a dashboard light, and the illumination control module increases the illumination setting of the dashboard light in response to a driver looking at the dashboard. In certain embodiments, the illuminable region includes a rear window, the at least one light associated with the illuminable region includes a dome light, and the illumination control module decreases the illumination setting of the dome light in response to a driver looking at the rear window.

In some embodiments, the apparatus includes a driving environment module that determines an ambient light level, wherein the light level module determines the light level based on the ambient light level. In some embodiments, the apparatus includes a vehicle status module that determines a status of the vehicle, wherein the light level module determines the light level based on the determined status. In certain embodiments, the status of the vehicle may include a speed of the vehicle, the light level module determining a first light level in response to the vehicle being stopped and a second light level, different than the first light level, in response to the vehicle being in motion.

In some embodiments, the apparatus includes a tinted lens module that determines whether the vehicle occupant is wearing a tinted lens and increases the determined light level in response to the vehicle occupant wearing a tinted lens. In some embodiments, the apparatus includes an illumination return module that reverts the illumination setting of the at least one light to a prior value in response to the occupant looking away from the illuminable region.

The method, in one embodiment, includes determining, by use of a processor, that an automobile occupant is looking at an illuminable region, identifying the automobile occupant, and adjusting an illumination value of at least one light associated with the illuminable region based on the automobile occupant. In some embodiments, the method also includes determining that the automobile occupant is no longer looking at the illuminable region and reverting the illumination value to a prior value in response to the automobile occupant no longer looking at the illuminable region. In some embodiments, the method also includes initiating a timer in response to adjusting the illumination value of the at least one light and reverting the illumination value to a prior value in response to expiration of the timer.

In some embodiments, the method also includes associating a user profile with the automobile occupant, the user profile including user preferences for light levels, wherein adjusting the illumination value based on the automobile occupant includes determining a light level preference for the illuminable region based on the user profile. In some embodiments, the method also includes comparing the light level preference for the illuminable region based on the user profile to a driver limit, wherein adjusting the illumination value based on the automobile occupant comprises setting the illumination value for at least one light to the lesser of the light level preference and the driver limit.

In some embodiments, the method also includes storing a stationary lighting profile and a moving lighting profile for the illuminable region and determining whether the automobile is stopped, wherein adjusting the illumination value of the at least one light includes retrieving an illumination value from the stationary lighting profile in response to the automobile being stopped, and retrieving an illumination value from the moving lighting profile in response to the automobile being in motion. In certain embodiments, adjusting the illumination level based on the automobile occupant includes identifying a plurality of illumination levels compatible with the at least one light and setting the at least one light to one of a plurality of illumination levels closest to a light level preference associated with the automobile occupant.

The program product, in one embodiment, includes a computer readable storage medium that stores code executable by a processor, the executable code comprising code to perform—detecting that an vehicle occupant is looking at an illuminable area, identifying the vehicle occupant, determining a light level for the illuminable area based on the vehicle occupant, and adjusting an illumination level of at least one light associated with the illuminable region based on the determined light level. In certain embodiments, determining the light level for the illuminable area comprises identifying a user profile for the occupant, the user profile including user preferences for light levels, and selecting a light level preference for the illuminable region based on the user profile.

In some embodiments, the program product also includes code to perform determining whether an ambient light level exceeds a daytime threshold, entering a daytime mode in response to the ambient light level exceeding the daytime threshold, and entering a nighttime mode in response to the ambient light level not exceeding the daytime threshold, wherein determining the light level for the illuminable area includes selecting a illumination level based on the entered mode.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
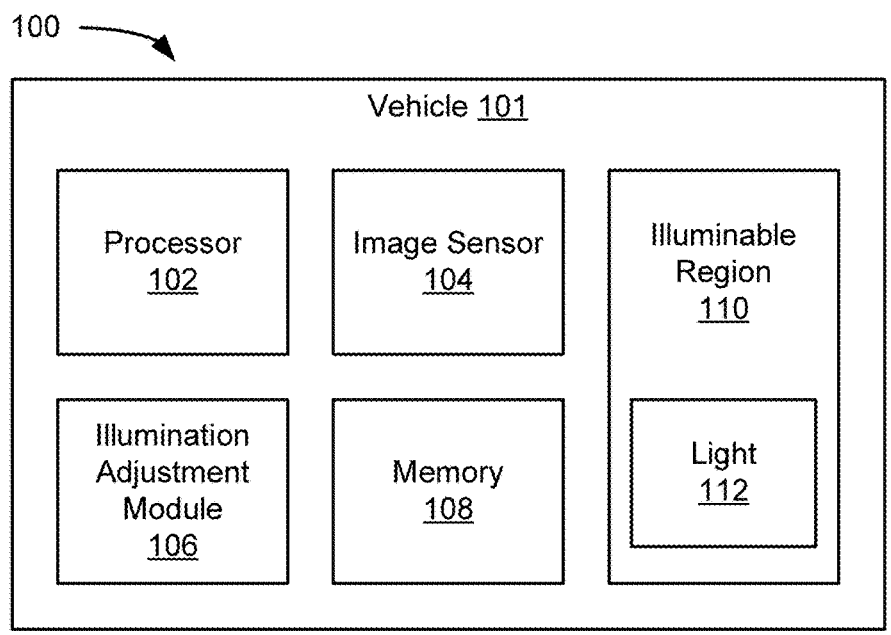
FIG. 1 is a schematic block diagram illustrating one embodiment of a system for automatically adjusting a vehicle light level based on a viewing location of an occupant.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages, including an object oriented programming language such as Java, Smalltalk, C++ or the like and conventional procedural programming languages, such as the "C" programming language or similar programming languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the disclosed systems, apparatuses, methods, and computer program products determine an illuminable region corresponding to a viewing location of a vehicle occupant and automatically adjust an illumination setting of at least one light associated with the illuminable region. As used herein, a vehicle may be a ground vehicle, an aircraft, or a watercraft. Using facial recognition and eye tracking a vehicle can determine who is driving (or piloting), who the passengers are, and can raise or lower the brightness of components as a person looks at them. The amount of brightness can be determined by who is looking at it, or preferences based on the driver since they should control that aspect of the vehicle.

An additional benefit could be controlling the rear roof lights or other lights based on if the driver looks at the rearview minor at night. In this example, the rear lights would shut off as the driver tries to see out the rear of the vehicle. Along with eye tracking, head tracking could be used as well for this same feature, if the driver looks towards the rear of the vehicle while at night, the lights could turn off to help the driver check their blind spot, but if a passenger looks towards the rear of the car, then the lights could come on. Another aspect that can be solved in a similar manner is to detect that a person's eyes are not visible due to sunglasses or tinted eye-glasses. If tinted glasses are detected, the car could allow the dashboard lights to get brighter to compensate for the tinting.

FIG. 1 depicts a system 100 for automatically adjusting a vehicle light level based on a viewing location of an occupant, according to embodiments of the disclosure. The system 100 includes a vehicle 101 containing a processor 102, an image sensor 104, an illumination adjustment module 106, and a memory 108. The vehicle 101 further includes at least one illuminable region 110, each illuminable region including at least one light 112 that illuminates the illuminable region 110.

The processor 102, in one embodiment, may comprise any known controller capable of executing computer-readable instructions and/or capable of performing logical operations. For example, the processor 102 may be a microcontroller, a microprocessor, a central processing unit (CPU), a graphics processing unit (GPU), an auxiliary processing unit, a FPGA, or similar programmable controller. In some embodiments, the processor 102 executes instructions stored in the memory 108 to perform the methods and routines described herein. The processor 102 is communicatively coupled to the image sensor 104, the illumination adjustment module 106, and the memory 108. In some embodiments, the processor 102 is also communicatively coupled to the at least one light 112, for example the processor 102 may control the output of the at least one light 112.

The image sensor 104, in one embodiment, may comprise any known sensor for capturing an image, including a digital camera, one or more photoelectric sensors, or the like. The image sensor 104 captures images of the occupants of the vehicle 101 in sufficient quality (e.g., resolution) to allow the illumination adjustment module 106 to determine a viewing location of the occupant (e.g., a point where the occupant is gazing) and an occupant location within the vehicle 101. In some embodiments, the image sensor 104 captures images of sufficient quality to allow the illumination adjustment module 106 to identify an identity of the occupant, for example, by examining physical characteristics of the occupant for matching the occupant with a stored user profile. In some embodiments, the image sensor 104 captures occupant location data, face location and/or face orientation data, and eye location and/or eye movement data from the image data, as discussed in further detail below with reference to FIG. 2.

The illumination adjustment module 106, in one embodiment, is configured to determine an illuminable region 110 corresponding to a viewing location of a vehicle occupant based on data from the image sensor 104, determine a light level for the illuminable region 110, and adjust an illumination setting of at least one light 112 associated with the illuminable region 110 based on the determined light level. In some embodiments, the illumination adjustment module 106 also identifies the vehicle occupant, wherein determining the light level based on the identity of the vehicle occupant. In further embodiments, the illumination adjustment module 106 reverts the illumination setting of the at least one light 112 to a prior value in response to the vehicle occupant looking away from the illuminable region 110.

The illumination adjustment module 106 may be comprised of computer hardware, computer software, or a combination of both computer hardware and computer software. For example, the illumination adjustment module 106 may comprise circuitry, or a processor, configured to determine an illuminable region corresponding to a viewing location of a vehicle occupant. As another example, the illumination adjustment module 106 may comprise computer program code that allows the processor 102 to adjust an illumination setting of a light associated with an illuminable region. The illumination adjustment module 106 is discussed in further detail with reference to FIG. 2, below.

The memory 108, in one embodiment, is a computer readable storage medium. In some embodiments, the memory 108 includes volatile computer storage media. For example, the memory 108 may include a random access memory (RAM), including dynamic RAM (DRAM), synchronous dynamic RAM (SDRAM), and/or static RAM (SRAM). In some embodiments, the memory 108 includes non-volatile computer storage media. For example, the memory 108 may include a hard disk drive, a flash memory, or any other suitable non-volatile computer storage device. In some embodiments, the memory 108 includes both volatile and non-volatile computer storage media.

In some embodiments, the memory 108 stores data relating to automatically adjusting a vehicle light level based on a viewing location of an occupant. For example, the memory 108 may store associations between illuminable regions 110 and lights 112, illumination settings for the lights 112, lighting profiles, user profiles, and the like. In some embodiments, the memory 108 also stores program code and related data, such as an operating system or other controller algorithms operating on the electronic device 101.

The at least one illuminable region 110, in one embodiment, comprises an area of the vehicle capable of being illuminated by at least one light 112. The at least one light 112, in one embodiment, comprises a lamp of the vehicle 101 capable of generating light and being controlled by the illumination adjustment module 106. Examples of illuminable regions 110 include, but are not limited to, a dashboard, an instrument cluster, or other section of the dashboard, an entertainment system (e.g., a car radio), a navigation system, or the like. Further examples of illuminable regions 110 include a front passenger area (e.g., lit by a reading lamp), a rear cabin area including a rear window (e.g., lit by a dome lamp), a rear passenger area, and a rear cargo area.

Examples of lights 112 include, but are not limited to, interior lights such as dashboard lights, display backlights, emissive displays, dome lights, and reading lights. In one embodiment, the at least one light 112 may include an exterior light such as a reverse lamp for illuminating an external area adjacent to the rear of the vehicle 101 (e.g., an external illuminable region 110) or a side marker lamp for illuminating an external area adjacent to the side of the vehicle 101. In one embodiment, the lights 112 controlled by the illumination adjustment module 106 do not include vehicle headlights or other front-facing exterior vehicle lights.

While only one illuminable region 110 and one light 112 are depicted in FIG. 1, it should be understood that the vehicle 101 may comprise a plurality of illuminable regions 110 and a plurality of lights 112. In some embodiments, the illuminable regions 110 may overlap wherein light from a particular light 112 reach into an illuminable region 110 not associated with the particular light 112. In one embodiment, each illuminable region includes a single light 112, such that there is a one-to-one correspondence between the illuminable regions 110 and the lights 112 controlled by the illumination adjustment module 106 (e.g., there is one illuminable region 110 for each light 112 controlled by the illumination adjustment module 106). In other embodiments, a single light 112 may be associated with a plurality of illuminable regions 110.

Figure 2:
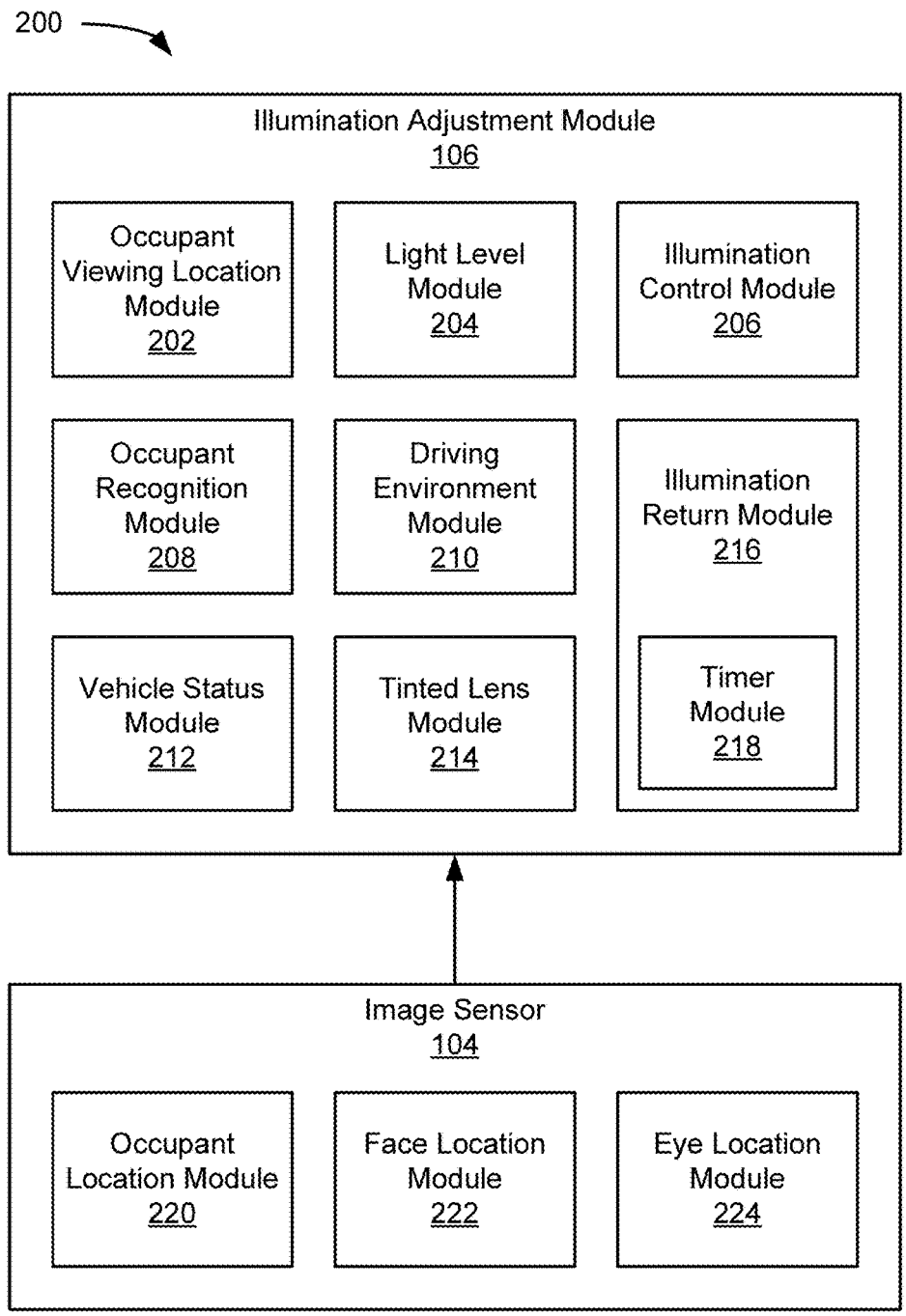
FIG. 2 is a schematic block diagram illustrating one embodiment of an apparatus for automatically adjusting a vehicle light level based on a viewing location of an occupant.

FIG. 2 depicts an apparatus 200 for automatically adjusting a vehicle light level based on a viewing location of an occupant, according to embodiments of the disclosure. The apparatus 200 includes an image sensor 104 communicatively coupled to a illumination adjustment module 106, each of which may be substantially similar to the image sensor 104 and the illumination adjustment module 106 described above with reference to FIG. 1. In general, as described above, the apparatus 200 determines an illuminable region 110 corresponding to a viewing location of a vehicle occupant based on data from the image sensor 104, determines a light level for the illuminable region 110, and adjusts an illumination setting of at least one light 112 associated with the illuminable region 110 based on the determined light level. In some embodiments, the apparatus 200 identifies the vehicle occupant, wherein determining the light level based on the identity of the vehicle occupant. In further embodiments, the apparatus 200 reverts the illumination setting of the at least one light 112 to a prior value in response to the vehicle occupant looking away from the illuminable region 110.

The illumination adjustment module 106, in one embodiment, includes an occupant viewing module 202, a light level module 204, and an illumination control module 206. In some embodiments, the illumination adjustment module 106 also includes one or more of an occupant recognition module 208, a driving environment module 210, a vehicle status module 212, a tinted lens module 214, illumination return module 216, and/or a timer module 218. The image sensor 104, in one embodiment, includes one or more of an occupant location module 220, a face location module 222, and/or an eye location module 224. The modules of the image sensor 104 and the illumination adjustment module 106 may be communicatively coupled to one another.

The occupant viewing location module 202, in one embodiment, is configured to determine an illuminable region corresponding to a viewing location of a vehicle occupant based on data from the image sensor. Examples of illuminable regions include a dashboard, an instrument cluster, or other section of the dashboard, an entertainment system (e.g., a car radio), a navigation system, or the like. Further examples of illuminable regions include a front passenger area (e.g., lit by a reading lamp), a rear cabin area including a rear window (e.g., lit by a dome lamp), a rear passenger area, a rear cargo area, an external area adjacent to the rear of the vehicle (e.g., lit by a reverse lamp), an external area adjacent to the side of the vehicle (e.g., lit by a side marker lamp or the like).

In some embodiments, the occupant viewing module 202 receives image data from the image sensor 104 and tracks eye movement to determine the viewing location (e.g., a point where the occupant is gazing). In some embodiments, the occupant viewing module 202 tracks facial movement and orientation to determine the viewing location (e.g., an area where the occupant is facing). Accordingly, the occupant viewing module 202 may determine that the occupant is looking at a particular illuminable region.

In response to determining the viewing location, the occupant viewing module 202 may then identify an illuminable region corresponding to the viewing location. In some embodiments, the occupant viewing module 202 retrieves a mapping of viewing locations to illuminable regions. In some embodiments, the occupant viewing module 202 searches a data structure for an illuminable region corresponding to the viewing location. In response to determining the illuminable region, the occupant viewing module 202 may then provide an indication (e.g., an identifier) of the illuminable region to the light level module 204, wherein the light level module 204 determines a light level for the illuminable region.

In some embodiments, the occupant viewing module 202 may detect when the occupant looks away from the illuminable region. For example, the occupant may glance away from an instrument cluster (e.g., the illuminable region) to look out of the front windshield. As another example, the occupant may look away from a first illuminable region to look at a second illuminable region. In certain embodiments, the occupant viewing module 202 may provide an indication to the illumination control module 206 that the viewing location has changed, wherein the illumination control module 206 restores an illumination setting for the illuminable region corresponding to the viewing location to a default value.

The light level module 204, in one embodiment, is configured to determine a light level for the illuminable region. The light level module 204 receives an indication (e.g., an identifier) of the illuminable region from the occupant viewing module 202 and determines a light level for that region. The light level module 204 may then provide an indication of the light level to the illumination control module 206, whereby the illumination control module 206 adjusts the one or more lights based on the determined light level.

In certain embodiments, the light level module 204 may determine the light level based on one or more of an identity of the occupant, on ambient light levels, on time of day, on a vehicles status, and the like. For example, where the illuminable region is a dashboard, the light level module 204 may select a light level based on the time of day (e.g., daytime or nighttime). As another example, where the illuminable region comprises a rear cabin area having a rear window, the light level module 204 may select a light level based on a vehicle speed (e.g., higher light levels when the vehicle is stationary and lower light levels when the vehicle is in motion).

In some embodiments, the light level module 204 determines a light level for the illuminable region based on the identity of the occupant. In certain embodiments, the light level module 204 receives, for example from the occupant recognition module 208, an indication of the occupant's role (e.g., driver or passenger) and selects a light level based on whether the occupant is driving the vehicle. In certain embodiments, the light level module 204 receives, for example from the occupant recognition module 208, a user profile corresponding to the occupant. The light level module 204 may then select a light level based on the occupant's lighting preferences for the illuminable region contained in the user profile.

In some embodiments, the light level module 204 may override the occupant's lighting preferences based on who is driving the vehicle. For example, the light level module 204 may select a lower light level than a passenger's preference if the preferred light level would be distracting or would visually impair the driver. The light level module 204 may compare the occupant's preference for the illuminable region (obtained from the occupant's user profile) to a driver limit and set the light level to the lesser of the occupant's preference and the driver limit.

In some embodiments, the light level module 204 determines whether an amount of ambient light exceeds a daytime threshold, wherein the light level for the illuminable region is based on the amount of ambient light. For example, the light level module 204 may select a daytime light level in response to the ambient light level exceeding the daytime threshold and a nighttime light level in response to the ambient light level not exceeding the daytime threshold. In further embodiments, the light level module 204 may select a light level based on an operating mode (e.g., a daytime mode or a nighttime mode), wherein the operating mode is based on the amount of ambient light.

In some embodiments, the light level module 204 may identify a set of brightness levels supported by a light illuminating the illuminable region and select a light level from the set of brightness levels. In certain embodiments, the light level may be one of two levels: on or off. For example, a reading lamp illuminating a passenger area may be turned on or off, but may not support a plurality of brightness levels. In certain embodiments, the light level may be one of a plurality of light levels supported by a light illuminating the illuminable region. For example, a light illuminating an electronic instrument cluster may support a plurality of discrete brightness levels. As another example, a dome light illuminating a passenger area may be dimmable, thereby supporting a plurality of brightness levels.

The illumination control module 206, in one embodiment, is configured to adjust an illumination setting of at least one light associated with the illuminable region based on the determined light level. In some embodiments, the illumination control module 206 may identify a light corresponding to the illuminable region and adjust an amount of illumination provided by the identified light based on a light level value received from the light level module 204. For example, where the illuminable region is a dashboard, the illumination control module 206 may increase an illumination setting of a dashboard light in response to a driver looking at the dashboard. As another example, where the illuminable region comprises rear cabin area having a rear window, the illumination control module 206 may decreases an illumination setting a dome light in the rear cabin area responsive to the driver looking at the rear window.

In some embodiments, the at least one light provides illumination at one of a plurality of brightness levels, each brightness level corresponding to an illumination setting. Accordingly, the illumination control module 206 may identify a set of brightness levels supported by the at least one light and select an illumination setting (e.g., brightness level) corresponding to the determined light level. In further embodiments, the illumination control module 206 may select an illumination level closest to the determined light level. In certain embodiments, the illumination control module 206 may select the illumination setting based on the occupants' role (e.g., driver or passenger), on a time of day (e.g., select a brighter setting during the daytime and a lower setting during the nighttime), and/or on a vehicle speed (e.g., a brighter setting when stationary and a lower setting when in motion).

In some embodiments, the illumination control module 206 selects an illumination setting based on a user profile corresponding to the occupant, for example according to the occupant's lighting preferences for the illuminable region contained in the user profile. In some embodiments, the illumination control module 206 may override the occupant's lighting preferences based on who is driving the vehicle. For example, the illumination control module 206 may select a lower light level than a passenger's preference if the preferred light level would be distracting or would visually impair the driver. The illumination control module 206 may compare the occupant's preference for the illuminable region (obtained from the occupant's user profile) to a driver limit and set the light level to the lesser of the occupant's preference and the driver limit.

In some embodiments, the illumination control module 206 determines whether the vehicle occupant is wearing a tinted lens and increases the determined light level in response to the vehicle occupant wearing a tinted lens. For example, if the driver is wearing sunglasses, the illumination control module 206 may increase the light level determined by the light level module 204 to compensate for the tinted lenses. In some embodiments, the illumination control module 206 increases the light level by an amount based on the role of the occupant and/or on a lighting preference associated with the occupant (e.g., contained in the occupant's user profile).

In some embodiments, the illumination control module 206 reverts the illumination setting of the at least one light to a prior value in response to the occupant looking away from the illuminable region. In some embodiments, the illumination control module 206 analyzes image data to determine whether the occupant is looking away from the illuminable region. In certain embodiments, the illumination control module 206 receives an indication of whether the occupant is looking away from the illuminable region from another module, such as the occupant viewing module 202.

In some embodiments, the illumination control module 206 reverts the illumination setting of the at least one light to default setting. In certain embodiments, the default setting is based on an ambient light level. In some embodiments, the illumination control module 206 reverts the illumination setting to a prior value by searching in memory (e.g., the memory 108) for a prior illumination value. In some embodiments, the illumination return module 216 may revert the illumination setting to a prior value in response to expiration of the timer.

In certain embodiments, the illumination control module 206 adjusts the illumination setting by modifying a voltage and/or amperage value at the at least one light. In certain embodiments, the illumination control module 206 adjusts the illumination setting by modifying an amount of time the at least one light is powered on during a cycle. In certain embodiments, the illumination control module 206 adjusts the illumination setting by sending control command to the at least one light, the control command configured to adjust the illumination level. In certain embodiments, the illumination control module 206 adjusts the illumination setting by writing the prior value a particular location in memory (e.g., the memory 108), wherein the at least one light sets its illumination level to the value stored at the particular location.

The occupant recognition module 208, in one embodiment, is configured to identify the vehicle occupant, wherein the light level module 204 determines the light level based on the identity of the vehicle occupant. In some embodiments, the occupant recognition module 208 receives image data from the image sensor 104 and analyzes the image data to identify the occupant. The occupant recognition module 208 may then provide an indication of the occupant's identify to the light level module 204.

In some embodiments, the occupant recognition module 208 identifies the vehicle occupant according to the occupant's role, for example as a driver or as a passenger. For example, the occupant recognition module 208 may identify an occupant as the driver based on the occupant's location within the vehicle. In some embodiments, the occupant recognition module 208 may analyze the image data to recognize the occupant's face, for example via a facial recognition algorithm. The occupant recognition module 208 may then associate the vehicle occupant with a registered user based on the results of the image analysis. As used herein, a registered user is a vehicle occupant (e.g., a user of the vehicle) having a user profile stored with the illumination adjustment module 106. The user profile may include user preferences for light levels within the vehicle.

In one embodiment, the occupant recognition module 208 matches a lighting profile with the vehicle occupant based on the identity of the vehicle occupant. For example, the occupant recognition module 208 may associate a driver lighting profile with the vehicle occupant in response to the occupant being the driver. In some embodiments, the occupant recognition module 208 associates a user profile with the vehicle occupant based on the occupant's identity, for example in response to recognizing the occupant as a registered user. The user profile may include a plurality of user preferences for light levels of different illuminable regions. In certain embodiments, the user profile may include different sets of preferences for different scenarios including set of preferences for when the user is the driver and another set of preferences for when the user is a passenger. In certain embodiments, the user profile may include one set of preferences for ambient light levels above a certain threshold and another set of preferences for ambient light levels below the threshold. The light level module 204 may then adjust determining a light level preference for the illuminable region based on the user profile.

In some embodiments, the occupant recognition module 208 may limit comparing the light level preference for the illuminable region based on the user profile to a driver limit, wherein adjusting the illumination level based on the automobile occupant comprises setting the illumination level for at least one light to the lesser of the light level preference and the driver limit.

The driving environment module 210, in one embodiment, is configured to determine an ambient light level, wherein the light level module 204 determines the light level based on the ambient light level. As used herein, an ambient light level is a measure of the amount of light in a vehicle's driving environment, such as lighting conditions exterior to the vehicle. The ambient light level may indicate an environment around the vehicle (e.g., inside a tunnel or parking garage) or a time of day (e.g., daytime or nighttime).

In some embodiments, the driving environment module 210 is communicatively connected to one or more light sensors (e.g., a photoelectric sensor) and measures ambient light levels. In other embodiments, the driving environment module 210 receives an indication of an ambient light level from another device or module aboard the vehicle, such as an automatic headlight controller, a vehicle controller, or the like. In further embodiments, the driving environment module 210 may query the other device or module for an ambient light and receive the indication in reply.

In some embodiments, the driving environment module 210 determines whether an ambient light level exceeds a daytime threshold. The daytime threshold may be set by a manufacturer or provider; in certain embodiments the daytime threshold may be user adjustable. In further embodiments, the driving environment module 210 may set a lighting mode for the illumination adjustment module 106 based on whether the ambient light level exceeds the daytime threshold, wherein the light level module 204 determines the light level for the illuminable area based on the entered mode. For example, the driving environment module 210 may set a daytime mode in response to the ambient light level exceeding the daytime threshold and set a nighttime mode in response to the ambient light level not exceeding the daytime threshold.

In certain embodiments, the driving environment module 210 is further configures to determine a time of day, wherein the light level module 204 determines the light level based on the ambient light level. For example, the light level module 204 may determine a first light level during the daytime and a second light level during the nighttime. In further embodiments, the driving environment module 210 may set a lighting mode for the illumination adjustment module 106 based on the time of day, wherein the light level module 204 determines the light level for the illuminable area based on the entered mode.

The vehicle status module 212, in one embodiment, is configured to determine a status of the vehicle, wherein the light level module determines the light level based on the determined status. In some embodiments, the status of the vehicle may include a speed of the vehicle, a gear selector position (e.g., park, reverse, or drive), or the like. In certain embodiments, the status of the vehicle may also include a time of day and/or a vehicle location. In some embodiments, the vehicle status module 212 determines the vehicle status using one of more sensors configured to measure the status (e.g., a speed sensor or a gear selection sensor). In other embodiments, the vehicle status module 212 determines the vehicle status by querying a device or module aboard the vehicle, such as a vehicle controller, or the like.

In some embodiments, the vehicle status module 212 stores a plurality of lighting profiles associated with a vehicle status. The vehicle status module 212 may then retrieve a particular lighting profile based on the vehicle status, wherein the light level module 204 determines the light level based on the particular lighting profile. In certain embodiments, the lighting profile may also be based on an ambient light level, a vehicle location, and/or a time of day. For example, the vehicle status module 212 may select a lighting profile based on both a vehicle speed and an ambient light level. As another example, the vehicle status module 212 may select a lighting profile based on a selected gear and on the time of day.

In some embodiments, the vehicle status module 212 selects a lighting profile based on the vehicle speed. For example, the vehicle status module 212 may select a stationary lighting profile in response to the vehicle being stopped and a moving lighting profile in response to the vehicle being in motion. Accordingly, the light level module 204 may determine a first light level using the stationary profile in response to the vehicle being stopped, and a second light level, different than the first light level, in response to the vehicle being in motion.

In some embodiments, the vehicle status module 212 selects a parked lighting profile responsive to the gear selector being in "park" or in "neutral" and a driving lighting profile responsive to the gear selector being in "drive" or in "reverse." Accordingly, a light may be adjusted to a different value based on the selected lighting profile. For example, a dome light in a rear area of the vehicle may be turned on in response to the driver looking to the rear area while the vehicle in in "park," while the same dome light may be turned off in response to the driver looking to the rear area while the vehicle is in "drive." As another example, an exterior light may be turned on in response to the driver looking out a window while the vehicle is in "park" while the same light may not turn on in response to the driver looking out a window while the vehicle is in "drive."

The tinted lens module 214, in one embodiment, is configured to determine whether the vehicle occupant is wearing a tinted lens and increases the determined light level in response to the vehicle occupant wearing a tinted lens. For example, if the driver is wearing sunglasses, the tinted lens module 214 may increase the light level determined by the light level module 204 to compensate for the tinted lenses. In some embodiments, the tinted lens module 214 estimates a level of tint and increases the determined light level by a value based on the estimated tint level. In certain embodiments, the increase in the determined light level is based on whether the occupant's eyes are viewable through the tinted lens. For example, if the eyes are viewable, then the light level may be increased by a lesser amount while if the eyes are not visible, then the light level may be increased by a greater amount.

The illumination return module 216, in one embodiment, is configured to reverts the illumination setting of the at least one light to a prior value in response to the occupant looking away from the illuminable region. In some embodiments, the illumination return module 216 analyzes image data to determine whether the occupant is looking away from the illuminable region. In certain embodiments, the illumination return module 216 receives an indication of an illuminable region where the occupant is looking from the occupant viewing module 202 and compares a current region to a prior region to determine whether the occupant is looking away from the illuminable region.

Upon determining that the automobile occupant is no longer looking at the illuminable region, the illumination return module 216 reverts the illumination setting of the at least one light to a prior value. In some embodiments, the illumination return module 216 reverts the illumination setting to a prior value by setting the illumination setting of the at least one light to default setting. In certain embodiments, the default setting is based on an ambient light level. In some embodiments, the illumination return module 216 reverts the illumination setting to a prior value by searching in memory (e.g., the memory 108) for a prior illumination value.

In some embodiments, the illumination return module 216 may include a timer module 218 configured to initiate a timer in response to adjusting the illumination level of the at least one light. The illumination return module 216 may then revert the illumination setting to a prior value in response to expiration of the timer.

In certain embodiments, the illumination return module 216 reverts the illumination setting by modifying a voltage and/or amperage value at the at least one light. In certain embodiments, the illumination return module 216 may revert the illumination setting by modifying an amount of time the at least one light is powered on during a cycle. In certain embodiments, the illumination return module 216 reverts the illumination setting by sending an adjustment command to the at least one light, the command configured to adjust the illumination setting. In certain embodiments, the illumination return module 216 may revert the illumination setting by writing the prior value a particular location in memory (e.g., the memory 108), wherein the at least one light sets its illumination setting to the value stored at the particular location.

The timer module 218, in one embodiment, is configured to initiate a timer in response to adjusting the illumination level of the at least one light, wherein the illumination return module 216 reverts the illumination level to a prior value in response to expiration of the timer. In certain embodiments, the timer module 218 sets the timer value based on the illuminable region. For example, a first timer value may be used for the dashboard of the vehicle while a second, longer timer value may be used for a rear cargo area of the vehicle. In some embodiments, the timer is programmable by the user.

In some embodiments, the timer module 218 may stop and/or reset the timer in response to the user looking away from the illuminable region. For example, the illumination return module 216 may signal the timer module 218 to stop the timer in response to determining that the automobile occupant is no longer looking at the illuminable region. As another example, while a timer is running for a first illuminable region, the timer module 218 may reset the timer in response to the illumination control module 206 adjusting the illumination of a second illuminable region. While depicted as a sub-module of the illumination return module 216, in one embodiment, the timer module 218 is an independent module communicatively coupled to the illumination return module 216.

The occupant location module 220, in one embodiment, is configured to determine an occupant location data from the image data. In some embodiments, the occupant location module 220 identifies a seating location within the vehicle for the occupant. For example, the occupant location module 220 may determine whether the occupant is in the driver's seat or in a passenger seat. In certain embodiments, the occupant location module 220 may identify an occupant's role based on the seating location. In further embodiments, the occupant location module 220 may assign a priority to the occupant based on the seating location. For example, the occupant location module 220 may determine that the occupant is a driver receiving highest priority, a front passenger receiving a lesser priority, or a rear passenger receiving lowest priority.

In some embodiments, the occupant location module 220 may provide an indication of the occupant location to the light level module 204, wherein the light level module 204 determines the light level based on the occupant location. In further embodiments, the occupant location module 220 may also provide an indication of the occupant's role or priority to the light level module 204. While depicted as a part of the image sensor 104, in one embodiment the occupant location module 220 may be a component of the illumination adjustment module 106—for example, a sub-module of the light level module 204 and/or the occupant recognition module 208—used to analyze raw image data from the image sensor 104.

The face location module 222, in one embodiment, is configured to determine a face location data from the image data. In some embodiments, the face location module 222 determines a face orientation based on the face location. The face location data and/or face orientation may then be used by the occupant viewing module 202 to determine a viewing location. For example, the face orientation used for a rough estimate of viewing location, such as a front region of the vehicle (e.g., including a dashboard, an instrument cluster, a navigation system, an entertainment system, and the like), a side region, or a rear region. In further embodiments, the face location module 222 may determine if the occupant is facing the rear of the vehicle based on the face location data and/or face orientation. While depicted as a part of the image sensor 104, in one embodiment the face location module 222 may be a component of the illumination adjustment module 106—for example, a sub-module of the occupant viewing module 202—used to analyze raw image data from the image sensor 104.

The eye location module 224, in one embodiment, is configured to determine an eye location data from the image data. In some embodiments, the eye location module 224 also determines eye movement based on the eye location data. The eye location data and/or the eye movement may then be used by the occupant viewing module 202 to determine a viewing location. The eye location data allows for a more precise viewing location than the face location data. Additionally, in some embodiments the eye location module 224 may estimate a viewing location based on the eye location data and/or the eye movements. While depicted as a part of the image sensor 104, in one embodiment the eye location module 224 may be a component of the illumination adjustment module 106—for example, a sub-module of the occupant viewing module 202—used to analyze raw image data from the image sensor 104.

FIGS. 3A-3D depict embodiments of a vehicle 300 for automatically adjusting a vehicle light level based on a viewing location of an occupant. The vehicle 300, in one embodiment, is substantially similar to the vehicle 101 and may include an illumination adjustment module 106, and/or an apparatus 200, as described above with reference to FIGS. 1-2. As depicted, the vehicle 300 includes a plurality of illuminable areas including a driver area 302, a dashboard area 304, a media system area 306 (e.g., including an entertainment system and/or a navigation system), a front passenger area 308, a rearview minor area 310, a rear passenger area 312, a cargo area 314, a driver door exterior area 316, a passenger door exterior area 318, and a front exterior area 320, and a rear exterior area 322. There may be one or more lights controllable by an illumination adjustment module 106 in each of the areas 302-318 and 322. As depicted, the vehicle 300 includes a driver 324, a front passenger 326, and two rear passengers 328.

Figure 3A:
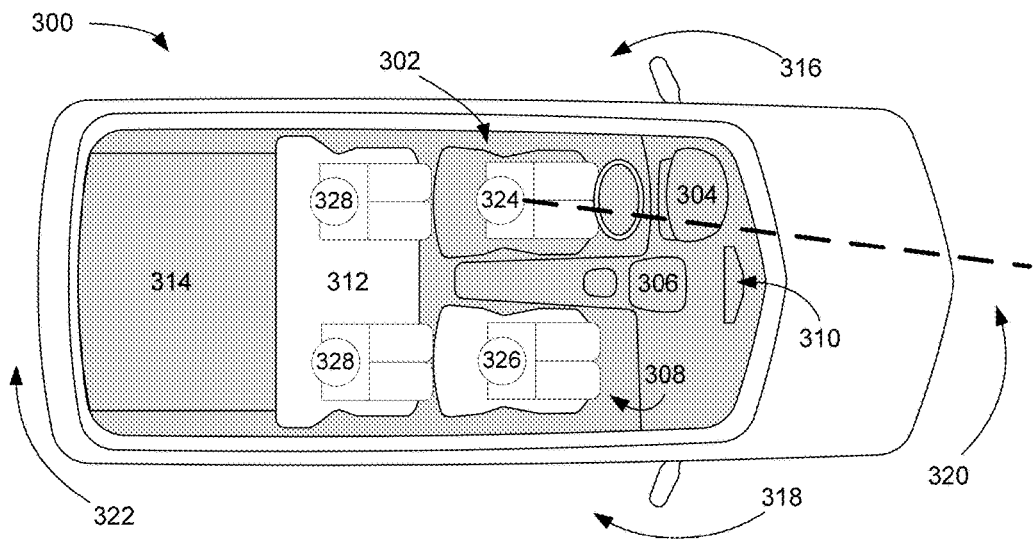
FIG. 3A is a top view diagram illustrating one embodiment of a vehicle for automatically adjusting a vehicle light level based on a viewing location of an occupant.

FIG. 3A depicts a top view of one embodiment of the vehicle 300 for automatically adjusting a vehicle light level. As depicted, the vehicle 300 may determine that the driver 324 is looking at the front exterior area 320, accordingly, lights associated with the driver area 302, dashboard area 304, media system area 306, front passenger area 308, rearview minor area 310, cargo area 314, driver door exterior area 316, passenger door exterior area 318, and rear exterior area 322 may be at a default value. In some embodiments, the default value is based on a vehicle speed, a time of day, and/or an amount of ambient light. For example, the default value for lights associated with the driver door exterior area 316, passenger door exterior area 318, and rear exterior area 322 may be zero (e.g., an "off" setting) due to the vehicle 300 being in motion. As depicted, the default light level for the areas 302-310 may be a low level due to the time of day being nighttime. In further embodiments, the default value may be based on a profile associated with driver, either a generic "driver" profile or a customized user stored in the vehicle 300.

In FIG. 3A, the light levels for the front passenger area 308 are set to a high level due to the front passenger 326 and/or rear passengers 328 requiring light. In one embodiment, the front passenger 326 may be reading, thus requiring a higher light level in the front passenger area 308 than the default level. In another embodiment, the front passenger 326 may be searching for an item in the rear passenger area 312, thus requiring a higher light level than the default level. The vehicle 300 may determine that the front passenger 326 is looking towards the front passenger area 308 and/or the rear passenger area 312 and may raise the light level accordingly.

In some embodiments, the rear passengers 328 may be reading, thus requiring a higher light level than the default level. In certain embodiments, the rear passengers 328 may manually set the light level for the rear passenger area 312 to a level suitable for reading, the manual setting subject to override. In other embodiments, the vehicle 300 may detect that the rear passengers 328 are looking towards the rear passenger area 312 and raise the light level accordingly.

Figure 3B:
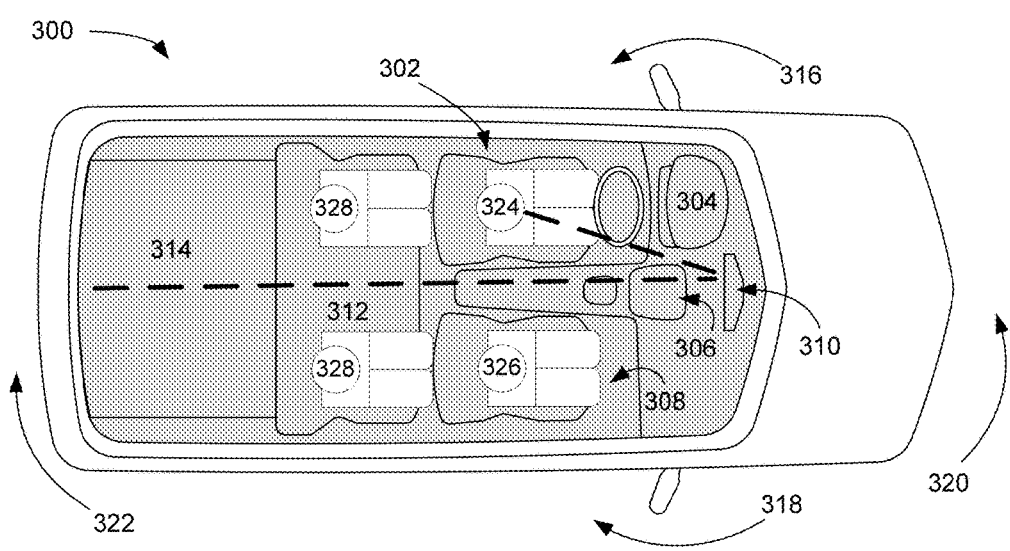
FIG. 3B is a top view diagram illustrating another embodiment of the vehicle of FIG. 3A.

FIG. 3B depicts a top view of another embodiment of the vehicle 300 for automatically adjusting a vehicle light level. Here, the vehicle 300 determines that the driver 324 is now looking at the rearview mirror area 310 (and consequently at the rear exterior area 322). The driver 324 may be unable to clearly see objects (e.g., other vehicles) in the rear exterior area 322 due to the lights associated with the front passenger area 308 and/or the rear passenger area 312 being at the higher level. Accordingly, the vehicle 300 may identify one or more lights associated with the rear exterior area 322 and automatically dim those lights in response to the user looking in the rear-view mirror.

In some embodiments, the vehicle 300 may associate any light in the front passenger area 308 (e.g., a passenger reading lamp), the rearview mirror area 310 (e.g., a map light), the rear passenger area 312 (e.g., a rear passenger dome light), and the cargo area 314 (e.g., a cargo dome light) with the rear exterior area 322 as any light in the areas 308-314 would affect the driver's ability to clearly see the rear exterior area 322. In response to identifying the lights associated with the rear exterior area 322, the vehicle 300 then determines a light level for each identified light.

In certain embodiments, the vehicle 300 determines the light level may be based on the occupant's identity (e.g., using a user profile associated with the occupant). In certain embodiments, the vehicle 300 determines the light level based on the occupant's location in the vehicle (e.g., the driver's seat). In some embodiments, the determined light level may be zero, a reduced level, or a default level. For example, in FIG. 3B, the vehicle 300 may determine that lights in the areas 310-314 should be at zero (e.g., "off") while a light associated with the front passenger area 308 may be set to a lower value, as the light in the front passenger area 308 may have a lesser impact on driver visibility of the rear exterior area 322.

Having determined light levels, the vehicle 300 may adjust one or more lights associated with the areas 308-314 based on the determined light levels. In some embodiments, the vehicle 300 adjusts the lights from a current illumination level to a new illumination level matching the determined light level. As depicted in FIG. 3B, the vehicle 300 may turn off the lights in the front passenger area 308 and rear passenger area 312 due to the current illumination levels not matching the determined light levels.

In some embodiments, the illumination levels for the lights associated with the areas 308-314 are temporarily adjusted, the vehicle 300 returning the illumination levels to a previous value in response to a trigger event. In some embodiments, the trigger event may be the vehicle 300 determining that the automobile occupant is no longer looking at the illuminable region. In other embodiments, the trigger event may be the vehicle 300 detecting expiration of a timer, the time being initiated in response to the vehicle 300 adjusting the illumination levels.

In certain situations the front passenger 326 may be looking at the media system area 306 while the driver 324 is looking at the rearview minor area 310. In some embodiments, the vehicle 300 may give higher priority to the driver 324 (e.g., which requires lower light levels) and override light levels determined for the front passenger 326, thus not adjust a light associated with the media system area 306 due to the driver override. In some embodiments, the vehicle 300 may identify a driver limit for the media system area 306 (e.g., based on a profile associated with the driver) and adjusting the illumination level of the light associated with the media system area 306 to the lesser of the light level preference and the driver limit.

Figure 3C:
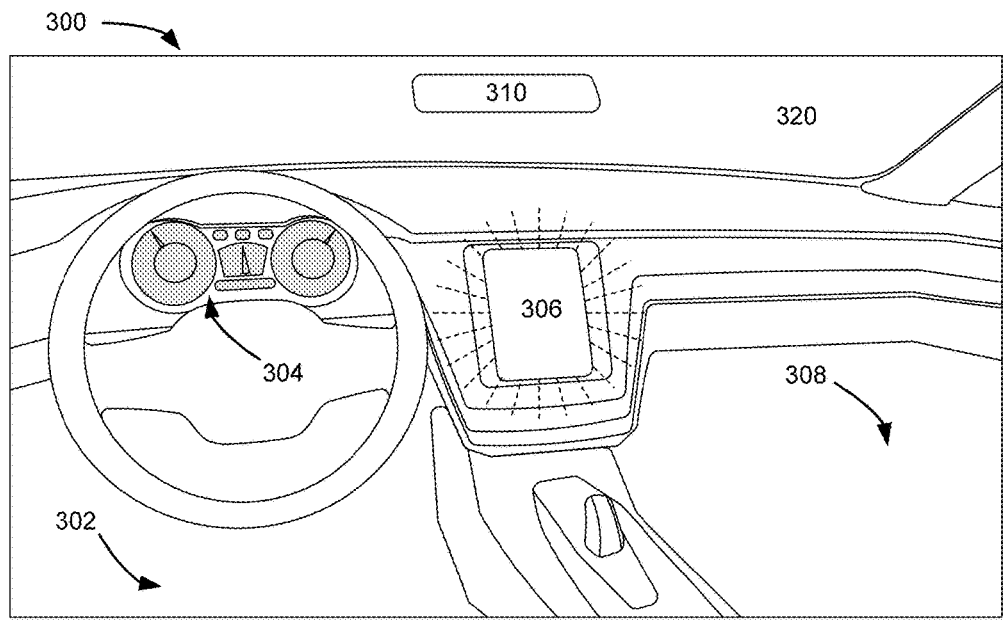
FIG. 3C is a perspective view diagram illustrating another embodiment of the vehicle of FIG. 3A.

FIG. 3C depicts a perspective view of another embodiment of the vehicle 300 for automatically adjusting a vehicle light level, as seen from the interior of the vehicle 300. As depicted, a backlight associated with the media system area 306 may be set to a higher level in response to the vehicle 300 determining that an occupant (e.g., the driver 324) is looking at the media system area 306. For example, the vehicle 300 may set the backlight for the media system area 306 to the higher level due to an ambient light level being below a daytime threshold and/or due to the occupant wearing tinted lenses (e.g., sunglasses). In some embodiments, the vehicle 300 set lights associated with the driver area 302, the dashboard area 304, the front passenger area 308, and the rearview mirror area 310 set to a default value (e.g., a low value for nighttime driving) when no occupant is looking at the associated areas.

Figure 3D:
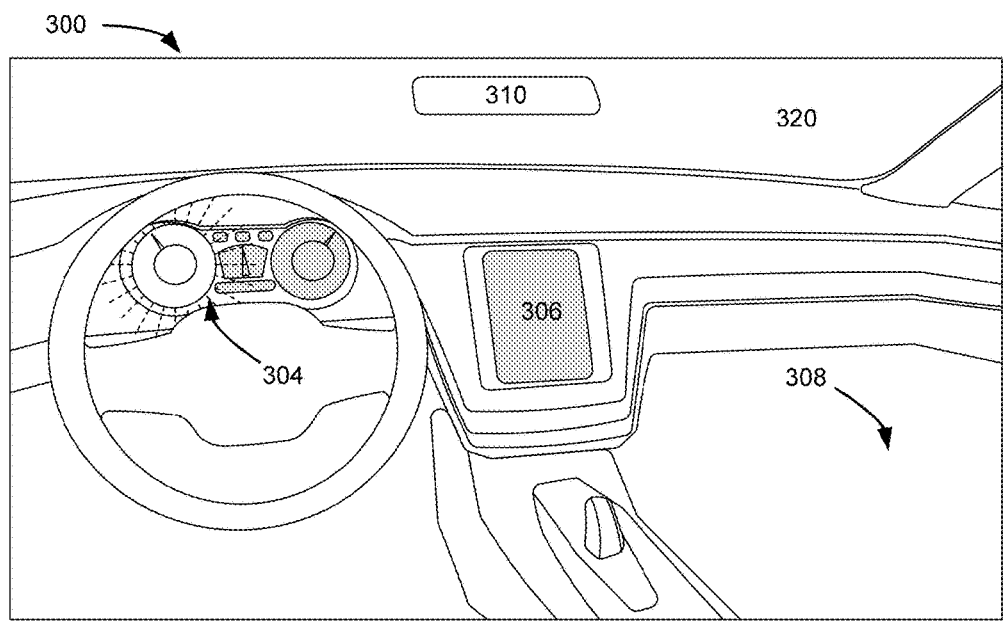
FIG. 3D is a perspective view diagram illustrating another embodiment of the vehicle of FIG. 3A.

FIG. 3D depicts a perspective view of another embodiment of the vehicle 300 for automatically adjusting a vehicle light level, as seen from the interior of the vehicle 300. Here, the vehicle 300 determines that the driver 324 is now looking at the dashboard area 304. In some embodiments, the vehicle 300 may identify a particular instrument gauge in the dashboard area 304 that the driver 324 is looking at. The vehicle 300 may then identify one or more lights associated with the dashboard area 304 and automatically dim those lights in response to the user looking in the rear-view minor. Additionally, the vehicle 300 may automatically revert the illumination level for the media system area 306 to a default value in response to the driver 324 looking away from the media system area 306.

Figure 4:
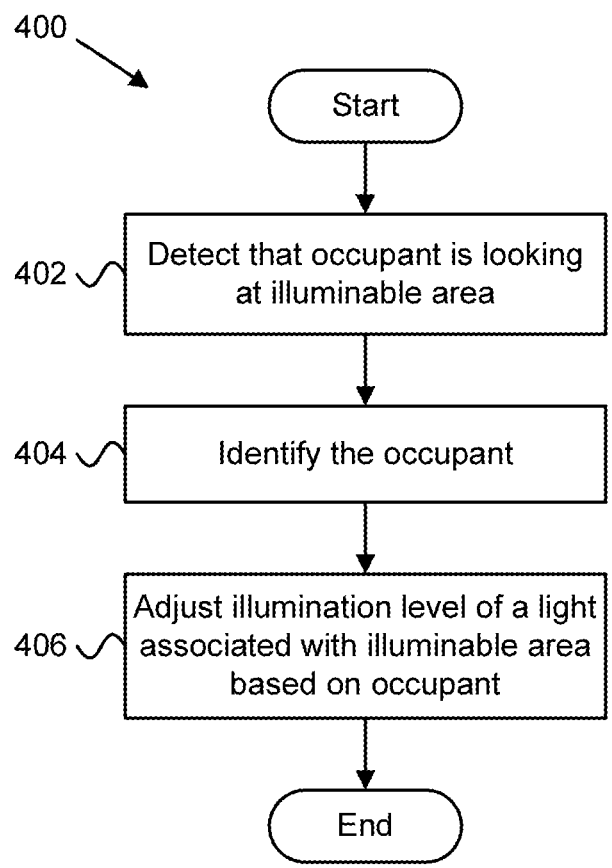
FIG. 4 is a schematic flow chart diagram illustrating one embodiment of a method for automatically adjusting a vehicle light level based on a viewing location of an occupant.

FIG. 4 depicts a method 400 for automatically adjusting a vehicle light level based on a viewing location of an occupant, according to embodiments of the disclosure. In some embodiments, the method 400 is performed by a vehicle for automatically adjusting a light level based on a viewing location of an occupant, such as the vehicle 101 and/or the vehicle 300 described above with reference to FIGS. 1 and 3. In other embodiments, the method 400 may be performed by an illumination adjustment module, such as the illumination adjustment module 106 described above with reference to FIGS. 1 and 2. In certain embodiments, the method 400 may be performed by a processor executing program code, for example, a microcontroller, a microprocessor, a central processing unit (CPU), a graphics processing unit (GPU), an auxiliary processing unit, a FPGA, or the like.

The method 400 begins and the vehicle detects 402 that a vehicle occupant is looking at an illuminable area of the vehicle. In some embodiments, detecting 402 that the occupant is looking at an illuminable area includes analyzing face location data gathered by an image sensor to identify an orientation of the occupant's face. The face orientation may then be correlated to an illuminable area. In other embodiments, detecting 402 that the occupant is looking at an illuminable area includes analyzing eye location data gathered by an image sensor to identify the occupant's point of gaze. The point of gaze may then be correlated to an illuminable area of the vehicle.

The vehicle then identifies 404 the vehicle occupant. In some embodiments, identifying 404 the vehicle occupant includes analyzing occupant location data gathered by an image sensor to identify the occupant as a driver or as a passenger. In other embodiments, identifying 404 the vehicle occupant includes analyzing biometric data, such as size, facial features, hair color, and the like, gathered by the image sensor to match the occupant to a stored user profile.

Next, the vehicle adjusts 406 an illumination level of at least one light associated with the illuminable area based on the vehicle occupant. In some embodiments, adjusting 406 the illumination level may include identifying the at least one light associated with the illuminable area. In some embodiments, adjusting 406 the illumination level includes associating a lighting profile with the occupant (e.g., a driver lighting profile or a particular user profile) and identifying one or more light level preferences for the illuminable area. In certain embodiments, a particular light level preference may be based on a vehicle status and/or an ambient light level. In certain embodiments, the light level preference is subject to a driver override, wherein the illumination value is set to a lesser of the light level preference and a driver limit.

In some embodiments, adjusting 406 the illumination level may include reverting the illumination level of the at least one light to a prior value in response to the occupant looking away from the illuminable region or in response to expiration of a timer. In some embodiments, adjusting 406 the illumination level may include determining whether the occupant is looking away from the illuminable region. In some embodiments, reverting the illumination level to a prior value may include searching in memory (e.g., the memory 108) for a prior illumination level.

In certain embodiments, adjusting 406 the illumination level may include modifying a voltage and/or amperage value at the at least one light. In certain embodiments, adjusting 406 the illumination level may include modifying an amount of time the at least one light is powered on during a cycle. In certain embodiments, adjusting 406 the illumination level may include sending an adjustment command to the at least one light, the command configured to adjust the illumination level. In certain embodiments, adjusting 406 the illumination level may include writing the prior value a particular location in memory (e.g., the memory 108), wherein the at least one light sets its illumination level to the value stored at the particular location. The method 400 ends.

Figure 5:
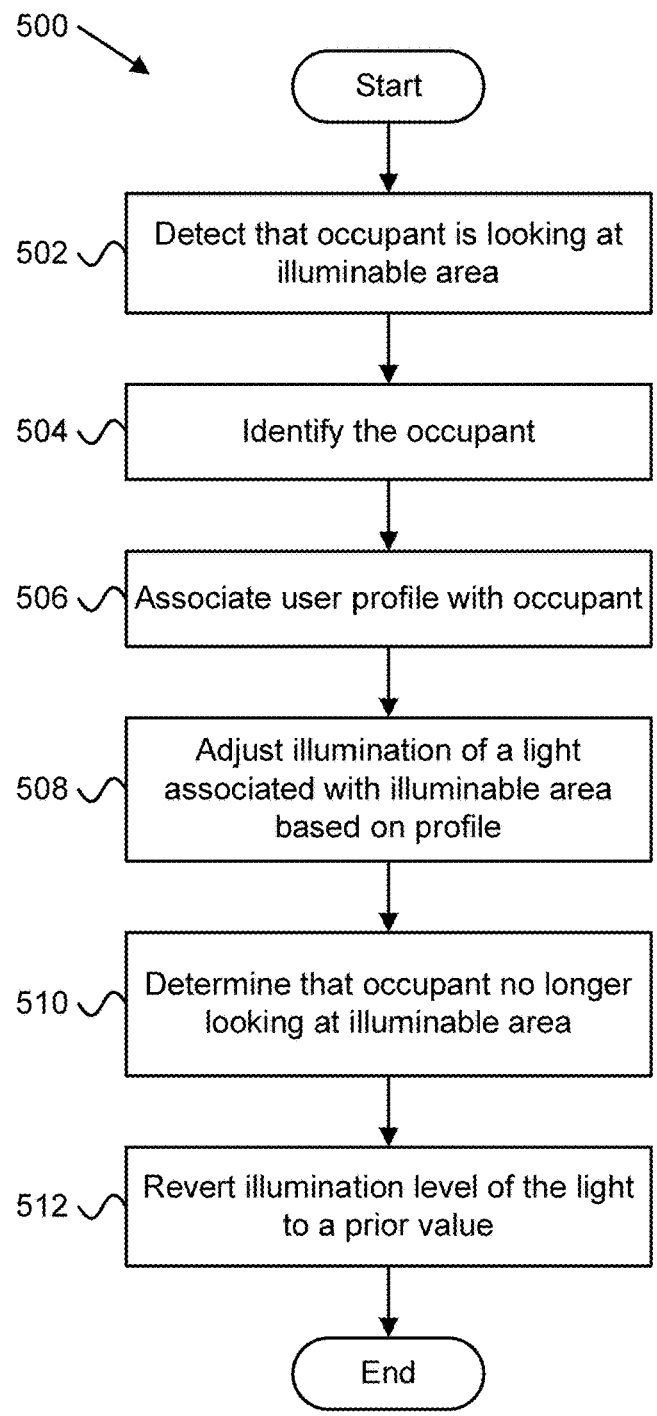
FIG. 5 is a schematic flow chart diagram illustrating another embodiment of a method for automatically adjusting a vehicle light level based on a viewing location of an occupant.

FIG. 5 depicts a method 500 for automatically adjusting a vehicle light level based on a viewing location of an occupant, according to embodiments of the disclosure. In some embodiments, the method 500 is performed by an vehicle for automatically adjusting a light level based on a viewing location of an occupant, such as the vehicle 101 and/or the vehicle 300 described above with reference to FIGS. 1 and 3. In other embodiments, the method 500 may be performed by an illumination adjustment module, such as the illumination adjustment module 106 described above with reference to FIGS. 1 and 2. In certain embodiments, the method 500 may be performed by a processor executing program code, for example, a microcontroller, a microprocessor, a central processing unit (CPU), a graphics processing unit (GPU), an auxiliary processing unit, a FPGA, or the like.

The method 500 begins and the vehicle detects 502 that a vehicle occupant is looking at an illuminable area of the vehicle. In some embodiments, detecting 502 that the occupant is looking at an illuminable area includes analyzing face location data gathered by an image sensor to identify an orientation of the occupant's face. The face orientation may then be correlated to an illuminable area. In other embodiments, detecting 502 that the occupant is looking at an illuminable area includes analyzing eye location data gathered by an image sensor to identify the occupant's point of gaze. The point of gaze may then be correlated to an illuminable area of the vehicle.

The vehicle then identifies 504 the vehicle occupant. In some embodiments, identifying 504 the vehicle occupant includes analyzing occupant location data gathered by an image sensor to identify the occupant as a driver or as a passenger. In other embodiments, identifying 504 the vehicle occupant includes analyzing biometric data, such as size, facial features, hair color, and the like, gathered by the image sensor to determine whether the occupant is a registered user.

Next, the vehicle associates 506 a user profile with the vehicle occupant. The user profile includes preferences for light levels. In some embodiments, associating 506 the user profile includes selecting a generic user profile based on the occupant's location (e.g., driver seat or passenger seat). In other embodiments, associating 506 the user profile includes matching the occupant with a user profile stored for a registered user.

The vehicle then adjusts 508 an illumination level of at least one light associated with the illuminable area based on the user profile. In some embodiments, adjusting 508 the illumination level may include identifying the at least one light associated with the illuminable area. In some embodiments, adjusting 508 the illumination level includes identifying one or more light level preferences for the illuminable area within the associated user profile. In certain embodiments, a particular light level preference may be based on a vehicle status and/or an ambient light level. In certain embodiments, the light level preference is subject to a driver override, wherein the illumination value is set to a lesser of the light level preference and a driver limit.

In certain embodiments, adjusting 508 the illumination level may include modifying a voltage and/or amperage value at the at least one light. In certain embodiments, adjusting 508 the illumination level may include modifying an amount of time the at least one light is powered on during a cycle. In certain embodiments, adjusting 508 the illumination level may include sending an adjustment command to the at least one light, the command configured to adjust the illumination level. In certain embodiments, adjusting 508 the illumination level may include writing the prior value a particular location in memory (e.g., the memory 108), wherein the at least one light sets its illumination level to the value stored at the particular location.

Next, the vehicle determines 510 that the vehicle occupant is no longer looking at the illuminable region. In some embodiments, determining 510 that the vehicle occupant is no longer looking at the illuminable region includes analyzing image data to determine whether the occupant is looking away from the illuminable region. In certain embodiments, determining 510 that the vehicle occupant is no longer looking at the illuminable region includes receiving an indication of a current illuminable region where the occupant is looking from the occupant viewing module 202 and comparing the current illuminable region to a prior illuminable region.

The vehicle then reverts 512 the illumination level of the at least one light associated with the illuminable area to a prior value in response to the automobile occupant no longer looking at the illuminable region. In some embodiments, reverting 512 the illumination level to a prior value includes reverting the illumination level of the at least one light to default level, wherein the default is based on an ambient light level. In some embodiments, reverting 512 the illumination level to a prior value includes searching in memory (e.g., the memory 108) for a prior illumination value.

In certain embodiments, reverting 512 the illumination level may include modifying a voltage and/or amperage value at the at least one light. In certain embodiments, reverting 512 the illumination level may include modifying an amount of time the at least one light is powered on during a cycle. In certain embodiments, reverting 512 the illumination level may include sending an adjustment command to the at least one light, the command configured to adjust the illumination level. In certain embodiments, reverting 512 the illumination level may include writing the prior value a particular location in memory (e.g., the memory 108), wherein the at least one light sets its illumination level to the value stored at the particular location. The method 500 ends.

Figure 6:
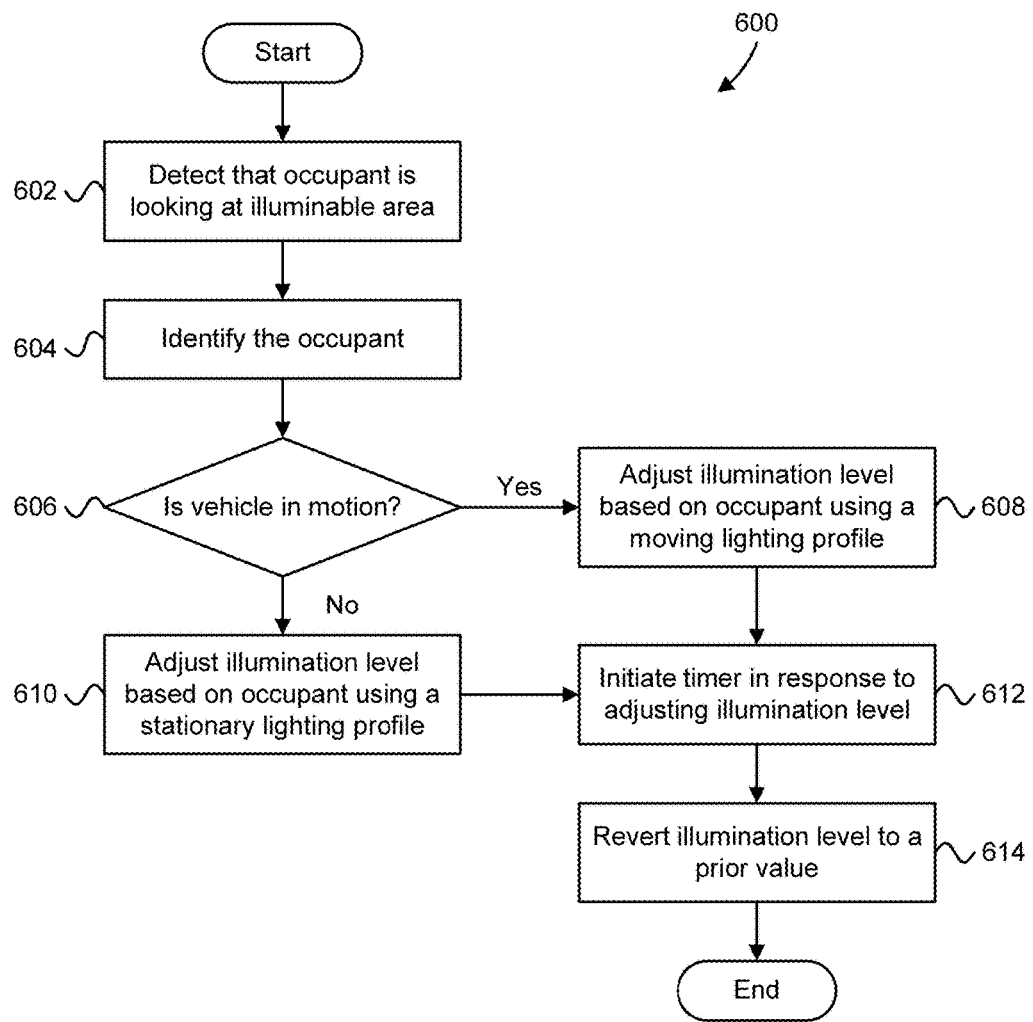
FIG. 6 is a schematic flow chart diagram illustrating another embodiment of a method for automatically adjusting a vehicle light level based on a viewing location of an occupant.

FIG. 6 depicts a method 600 for automatically adjusting a vehicle light level based on a viewing location of an occupant, according to embodiments of the disclosure. In some embodiments, the method 600 is performed by an vehicle for automatically adjusting a light level based on a viewing location of an occupant, such as the vehicle 101 and/or the vehicle 300 described above with reference to FIGS. 1 and 3. In other embodiments, the method 600 may be performed by an illumination adjustment module, such as the illumination adjustment module 106 described above with reference to FIGS. 1 and 2. In certain embodiments, the method 600 may be performed by a processor executing program code, for example, a microcontroller, a microprocessor, a central processing unit (CPU), a graphics processing unit (GPU), an auxiliary processing unit, a FPGA, or the like.

The method 600 begins and the vehicle detects 602 that a vehicle occupant is looking at an illuminable area of the vehicle. In some embodiments, detecting 602 that the occupant is looking at an illuminable area includes analyzing face location data gathered by an image sensor to identify an orientation of the occupant's face. The face orientation may then be correlated to an illuminable area. In other embodiments, detecting 602 that the occupant is looking at an illuminable area includes analyzing eye location data gathered by an image sensor to identify the occupant's point of gaze. The point of gaze may then be correlated to an illuminable area of the vehicle.

The vehicle then identifies 604 the vehicle occupant. In some embodiments, identifying 604 the vehicle occupant includes identifying the occupant's location within a vehicle and identifying the occupant's role (e.g., driver or passenger) based on the occupant's location. In some embodiments, identifying 604 the vehicle occupant includes analyzing the image data (e.g., using a facial recognition algorithm) to match the occupant with a registered user.

Next, the vehicle determines 606 whether the vehicle is in motion. In some embodiments, determining 606 whether the vehicle is in motion includes measuring a speed of the vehicle. In other embodiments, determining 606 whether the vehicle is in motion includes identifying a gear selector location (e.g., "park" or "drive"). If the vehicle determines 606 that the vehicle is in motion, then the vehicle adjusts 608 an illumination level of at least one light associated with the illuminable area based on the occupant using a moving lighting profile. Otherwise, if the vehicle determines 606 that the vehicle is stationary, then the vehicle adjusts 610 an illumination level of at least one light associated with the illuminable area based on the occupant using a stationary lighting profile.

Adjusting 608 the illumination level using a moving lighting profile includes identifying, within the moving lighting profile, one or more light level preferences for the illuminable area and setting the illumination level of the at least one light to a level matching the light level preference. In certain embodiments, the light level preference is subject to a driver override, wherein the illumination value is set to a lesser of the light level preference and a driver limit. In some embodiments, adjusting 608 the illumination level may include identifying the at least one light associated with the illuminable area.

In certain embodiments, adjusting 608 the illumination level using a moving lighting profile may include modifying a voltage and/or amperage value at the at least one light. In certain embodiments, adjusting 608 the illumination level using a moving lighting profile may include modifying an amount of time the at least one light is powered on during a cycle. In certain embodiments, adjusting 608 the illumination level using a moving lighting profile may include sending an adjustment command to the at least one light, the command configured to adjust the illumination level. In certain embodiments, adjusting 608 the illumination level using a moving lighting profile may include writing the prior value a particular location in memory (e.g., the memory 108), wherein the at least one light sets its illumination level to the value stored at the particular location.

Adjusting 610 the illumination level using a stationary lighting profile includes identifying, within the stationary lighting profile, one or more light level preferences for the illuminable area and setting the illumination level of the at least one light to a level matching the light level preference. In certain embodiments, the light level preference is subject to a driver override, wherein the illumination value is set to a lesser of the light level preference and a driver limit. In some embodiments, adjusting 610 the illumination level may include identifying the at least one light associated with the illuminable area.

In certain embodiments, adjusting 610 the illumination level using a stationary lighting profile may include modifying a voltage and/or amperage value at the at least one light. In certain embodiments, adjusting 610 the illumination level using a stationary lighting profile may include modifying an amount of time the at least one light is powered on during a cycle. In certain embodiments, adjusting 610 the illumination level using a stationary lighting profile may include sending an adjustment command to the at least one light, the command configured to adjust the illumination level. In certain embodiments, adjusting 610 the illumination level using a stationary lighting profile may include writing the prior value a particular location in memory (e.g., the memory 108), wherein the at least one light sets its illumination level to the value stored at the particular location.

The vehicle then initiates 612 a timer in response to adjusting the illumination level. The vehicle then reverts 614 the illumination level of the at least one light associated with the illuminable area to a prior value in response to expiration of the timer. In some embodiments, reverting 614 the illumination level to a prior value includes reverting the illumination level of the at least one light to default level, wherein the default is based on an ambient light level and/or on a user profile. In some embodiments, reverting 614 the illumination level to a prior value includes searching in memory (e.g., the memory 108) for a prior illumination value.

In certain embodiments, reverting 614 the illumination level may include modifying a voltage and/or amperage value at the at least one light. In certain embodiments, reverting 614 the illumination level may include modifying an amount of time the at least one light is powered on during a cycle. In certain embodiments, reverting 614 the illumination level may include sending an adjustment command to the at least one light, the command configured to adjust the illumination level. In certain embodiments, reverting 614 the illumination level may include writing the prior value a particular location in memory (e.g., the memory 108), wherein the at least one light sets its illumination level to the value stored at the particular location. The method 600 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    an image sensor;
    an occupant viewing location module that determines an illuminable region corresponding to a viewing location of a vehicle occupant based on data from the image sensor;
    an occupant recognition module that:
        matches the vehicle occupant with one of a plurality of stored profiles, and
        identifies a seat position of the vehicle occupant, the seat position being one of a driver seat, a front passenger seat, and a rear passenger seat;
    a light level module that:
        determines a light level for the illuminable region based on values in the matching profile and further based on the seat position, wherein the matching profile includes different light levels for the same illuminable region associated with different seat positions of the occupant, and
        identifies an illumination limit for the illuminable region, the illumination limit based on a driver of the vehicle; and
    an illumination control module that adjusts an illumination setting of at least one light associated with the illuminable region based on a lesser value of the determined light level and the illumination limit, in response to the determined seat position being one of the front passenger seat and the rear passenger seat.

2. The apparatus of claim 1, wherein the illuminable region comprises a dashboard, the at least one light associated with the illuminable region comprises a dashboard light, and the illumination control module increases the illumination setting of the dashboard light in response to a driver looking at the dashboard.

3. The apparatus of claim 1, wherein the illuminable region comprises a rear window, the at least one light associated with the illuminable region comprises a dome light, and the illumination control module decreases the illumination setting of the dome light in response to a driver looking at the rear window.

4. The apparatus of claim 1, further comprising a driving environment module that determines an ambient light level, wherein the light level module determines the light level based on the ambient light level.

5. The apparatus of claim 1, further comprising a vehicle status module that determines a status of the vehicle, wherein the light level module determines the light level based on the determined status.

6. The apparatus of claim 5, wherein the status of the vehicle comprises a speed of the vehicle, the light level module determining a first light level in response to the vehicle being stopped and a second light level, different than the first light level, in response to the vehicle being in motion.

7. The apparatus of claim 1, further comprising a tinted lens module that determines whether the vehicle occupant is wearing a tinted lens and increases the determined light level in response to the vehicle occupant wearing a tinted lens.

8. The apparatus of claim 1, further comprising an illumination return module that reverts the illumination setting of the at least one light to a prior value in response to the occupant looking away from the illuminable region.

9. The apparatus of claim 1, wherein the at least one light provides illumination at one of a plurality of illumination levels and the illumination control module sets the at least one light at an illumination level closest to the determined light level.

10. The apparatus of claim 1, wherein the illumination value for the illuminable region associated the driver seat position is a different illumination value than the illumination value associated with the front passenger seat position for the same illuminable region.

11. A method comprising:
determining, by use of a processor, that an automobile occupant is looking at an illuminable region;
identifying the automobile occupant, wherein identifying the automobile occupant comprises matching the automobile occupant with one of a plurality of stored profiles;
determining a seat position of the automobile occupant, the seat position being one of a driver seat, a front passenger seat, and a rear passenger seat;
determining a light level for the illuminable region based on values in the matching profile and further based on the seat position, wherein the matching profile includes different light levels for the same illuminable region associated with different seat positions of the occupant;
identifying an illumination limit for the illuminable region, the illumination limit based on a driver of the automobile;
comparing the determined light level for the illuminable region to the illumination limit in response to the determined seat position being one of the front passenger seat and the rear passenger seat; and
adjusting an illumination value of at least one light associated with the illuminable region based on a lesser value of the determined light level and the illumination limit, in response to the determined seat position being one of the front passenger seat and the rear passenger seat.

12. The method of claim 11, further comprising:
determining that the automobile occupant is no longer looking at the illuminable region; and
reverting the illumination value to a prior value in response to the automobile occupant no longer looking at the illuminable region.

13. The method of claim 11, further comprising:
initiating a timer in response to adjusting the illumination value of the at least one light; and
reverting the illumination value to a prior value in response to expiration of the timer.

14. The method of claim 11, further comprising associating a user profile with the automobile occupant, the user profile including user preferences for light levels, wherein adjusting the illumination value based on the automobile occupant comprises determining a light level preference for the illuminable region based on the user profile.

15. The method of claim 11, further comprising:
storing a stationary lighting profile and a moving lighting profile for the illuminable region; and
determining whether the automobile is stationary,
wherein adjusting the illumination value of the at least one light comprises:
retrieving an illumination value from the stationary lighting profile in response to the automobile being stationary, and
retrieving an illumination value from the moving lighting profile in response to the automobile being in motion.

16. The method of claim 11, wherein adjusting the illumination level based on the automobile occupant comprises:
identifying a plurality of illumination levels compatible with the at least one light; and
setting the at least one light to one of a plurality of illumination levels closest to a light level preference associated with the automobile occupant.

17. The method of claim 11, wherein the illumination value for the illuminable region associated the driver seat position is a different illumination value than the illumination value associated with the front passenger seat position for the same illuminable region.

18. A program product comprising a computer readable storage medium that stores code executable by a processor, the executable code comprising code to perform:
detecting that a vehicle occupant is looking at an illuminable area;
identifying the automobile occupant, wherein identifying the automobile occupant comprises matching the automobile occupant with one of a plurality of stored profiles;
determining a seat position of the automobile occupant, the seat position being one of a driver seat, a front passenger seat, and a rear passenger seat;
determining a light level for the illuminable area based on values in the matching profile and further based on the seat position, wherein the matching profile includes different light levels for the same illuminable area associated with different seat positions of the occupant;
comparing the determined light level for the illuminable area to a driver limit in response to the determined seat position being one of the front passenger seat and the rear passenger seat, wherein the driver limit is obtained from a second user profile belonging to a second occupant located in the driver seat; and
adjusting an illumination level of at least one light associated with the illuminable area based on the determined light level, wherein adjusting the illumination value based on the determined light level comprises setting the illumination value for the at least one light to a lesser value of the determined light level and the driver limit in response to the determined seat position being one of the front passenger seat and the rear passenger seat.

19. The program product of claim 18, the executable code further comprising code to perform:
determining whether an ambient light level exceeds a daytime threshold;
entering a daytime mode in response to the ambient light level exceeding the daytime threshold; and
entering a nighttime mode in response to the ambient light level not exceeding the daytime threshold,
wherein determining the light level for the illuminable area comprises selecting an illumination level based on the entered mode.

20. The program product of claim 18, wherein determining the light level for the illuminable area comprises identifying a user profile for the occupant, the user profile including user preferences for light levels, and selecting a light level preference for the illuminable area based on the user profile.

* * * * *